(12) United States Patent
Sorg et al.

(10) Patent No.: US 10,800,694 B2
(45) Date of Patent: Oct. 13, 2020

(54) FEEDING DEVICE FOR A GLASS MELTING PLANT

(71) Applicant: Beteiligungen Sorg GmbH & Co. KG, Lohr am Main (DE)

(72) Inventors: Helmut Sorg, Glattbach (DE); Philipp Heigl, Kitzingen (DE); Volker Müller, Steinfeld-Hausen (DE)

(73) Assignee: BETEILIGUNGEN SORG GMBH & CO. KG, Lohr am Main (DE)

( * ) Notice: Subject to any disclaimer, the term of this patent is extended or adjusted under 35 U.S.C. 154(b) by 56 days.

(21) Appl. No.: 16/157,909

(22) Filed: Oct. 11, 2018

(65) Prior Publication Data

US 2019/0112214 A1     Apr. 18, 2019

(30) Foreign Application Priority Data

Oct. 12, 2017   (DE) .................... 10 2017 123 803

(51) Int. Cl.
  *C03B 3/00*     (2006.01)
(52) U.S. Cl.
  CPC ............... *C03B 3/005* (2013.01); *C03B 3/00* (2013.01)
(58) Field of Classification Search
  CPC .................................. C03B 3/00; C03B 3/026
  See application file for complete search history.

(56) References Cited

U.S. PATENT DOCUMENTS

| 2,212,358 | A | | 8/1940 | Weekley |
| 2,398,952 | A | * | 4/1946 | Nachod .................. C03B 3/00 65/193 |
| 2013/0167587 | A1 | * | 7/2013 | Lindig .................... C03B 3/00 65/29.16 |

FOREIGN PATENT DOCUMENTS

| DE | 102010035893 B3 | 1/2012 |
| GB | 664869 A | 1/1952 |

OTHER PUBLICATIONS

European Search Report for corresponding European Patent Application No. 18199480.

* cited by examiner

*Primary Examiner* — Saul Rodriguez
*Assistant Examiner* — Willie Berry, Jr.
(74) *Attorney, Agent, or Firm* — Greer, Burns & Crain, Ltd.

(57) ABSTRACT

A feeding device for a glass melting plant, having a sealing device and at least one movement device, the movement device executing a cyclical movement during operation of the feeding device, and being guided along at least one feedthrough through the sealing device. Adjacent to an open area of each feedthrough at least one gas nozzle is situated on the side of the sealing device facing away from the glass melting plant in such a way that the gas flowing out from the at least one gas nozzle reduces the quantity of dust and/or exhaust gases that moves out of the glass melting plant through the respective feedthrough to the side of the sealing device facing away from the glass melting plant.

15 Claims, 6 Drawing Sheets

FEEDING DEVICE FOR A GLASS MELTING PLANT

CROSS-REFERENCES TO RELATED APPLICATIONS

This application claims the benefit of the German patent application No. 10 2017 123 803.4 filed on Oct. 12, 2017, the entire disclosures of which are incorporated herein by way of reference.

BACKGROUND OF THE INVENTION

The present invention relates to a feeding device for a glass melting plant that supplies bulk material made up of shards and/or raw material batch to the glass melting plant.

In the manufacture of glass products, the bulk material continuously or discontinuously supplied to a melt tub or a doghouse of the glass melting plant is made up of shards and primary raw materials (raw material batch). The shards can originate from returns from faulty productions, and/or can be so-called recycling shards. The initial raw material for the glass production is referred to as the raw material batch. This includes, for example, quartz sand, soda, nitrate, sulfate, sodium sulfate, potash, feldspar, clay, lime, and dolomite. These raw materials are supplied to the glass melting plant in the desired composition, in the form of the raw material batch.

A feeding device is a device forming a separate unit from the glass melting plant, and which supplies the bulk material, available in one or more supply containers, to the glass melting plant (i.e., directly to a melt tub or to a doghouse) in a specifiable quantity per time unit. For this purpose, the feeding device is situated between the one or more supply containers and the glass melting plant.

Because the supplying of the bulk material is done through an opening in the glass melting plant, in feeding devices for glass melting plants it is of particular interest for there to be a seal between the glass melting plant and the feeding device that is dust-tight and that holds back the heat from the glass melting plant. A feeding device frequently has a sealing device (e.g., a heat shield) that during operation of the feeding device is situated at least in some parts immediately on the wall of the glass melting plant (i.e., the wall of the melt tub or of the doghouse), or is situated with as small a distance as possible from the wall of the glass melting plant.

DE 10 2010 035 893 B3 discloses that the bulk material is forcibly driven in the direction of the glass melting plant by one or more screw conveyors. This type of supplying has the disadvantage that the supplied bulk material from the supply tube of the known feeding device is deposited only on the surface of the glass melt in the melting plant. However, this procedure is disadvantageous with regard to the melting of the bulk material. Therefore, in DE 10 2010 035 893 B3 it is proposed to use a slider (paddle) to better distribute the supplied bulk material on the surface of the glass melt. The slider runs transverse to the direction of supply of the bulk material and is fastened to a movement device (e.g., a linking rod) that is connected to a drive. By means of the drive, a cyclical movement of the slider is produced. In this way, the slider can, for example, first be immersed into the bulk material placed on the surface of the glass melt (for example, raw material batch), and can move this material away from the feeding device in the direction of the center of the glass melting plant. Subsequently, the slider is lifted out of the bulk material and moved back to the original position. DE 10 2010 035 893 B3 further teaches that the movement device has to be guided through an opening in the wall of the glass melting plant and, if warranted, through at least one feedthrough of the sealing device of the feeding device. The slider is situated on the front side of the sealing device (i.e., on the side of the sealing device facing the glass melting plant, or inside the glass melting plant), and the drive of the movement device is situated on the rear side of the sealing device of the feeding device (i.e., the side of the sealing device facing away from the glass melting plant).

During the use of such a feeding device, it is observed that the opening in the wall of the glass melting plant, and, if present, the feedthrough or the feedthroughs in the sealing device of the feeding device, are a source for dust or exhaust gas to exit from the interior of the glass melting plant. Flexible seals for the movement device (linkage rod) of the slider, for example a bellows or a brush-type seal, show a high degree of wear and their effectiveness declines quickly during use. A flexible seal is exposed to high temperatures in the area of the opening or the feedthrough. In addition, the dust collects, for example, in the bellows, so that the mobility of the bellows is impaired. In the worst case, the accumulation of dust causes mechanical destruction of the bellows.

SUMMARY OF THE INVENTION

An object of the present invention is therefore to create a feeding device that brings about a better seal of the at least one movement device (e.g., for the slider) and whose effectiveness is, in addition, not impaired over a long period of time.

According to the present invention, the feeding device includes at least one gas nozzle that is situated adjacent to an open area of each feedthrough of the sealing device on the side of the sealing device facing away from the glass melting plant, in such a way that the gas flowing out from the at least one gas nozzle reduces the quantity of dust and/or exhaust gas that flows out from the glass melting plant through the respective feedthrough to the side of the sealing device facing away from the glass melting plant.

This means that the at least one gas nozzle, according to the present invention, is situated on the rear side of the sealing device adjacent to an open area of the feedthrough in such a way that the gas flowing out from the at least one gas nozzle reduces the quantity of dust and/or exhaust gas that flows out from an area at the front side of the sealing device through the feedthrough into an area at the rear side of the sealing device. Preferably, the seal according to the present invention of the feedthrough results in a significant, almost complete reduction of the exit of dust and/or exhaust gas from the glass melting plant. The reduction achieved by the present invention of the quantity of dust and/or exhaust gas moving through the feedthrough or feedthroughs is at least 80%, preferably at least 90%, particularly preferably at least 95%.

A further advantage of the feeding device according to the present invention is that the seal takes place without contact to a certain extent, i.e., the at least one gas nozzle does not stand in direct mechanical connection with the sealing device and/or the wall of the glass melting plant. The at least one gas nozzle is situated at a specified distance from the sealing device and the feedthrough. This causes significantly lower wear of the seal compared to the alternative solutions described above.

As gas for the gas nozzle, preferably air (e.g., compressed air or blown air) is used. However, other gases are also conceivable.

The configuration of the gas nozzle adjacent to the open area of the feedthrough in the sealing device means that the distance between the gas nozzle and the feedthrough is realized such that the gas particles escaping from the gas nozzle reach the open area of the feedthrough, and there still have sufficient speed that at least the large majority part (at least 80%; see above) of the gas and/or dust particles coming out from the glass melting plant is deflected through impact with the exhaust gas particles of the gas nozzle in such a way that the gas and/or dust particles of this part do not pass through the feedthrough. For many applications, the distance of the at least one gas nozzle from the end of the feedthrough facing the gas nozzle is, for example, a maximum of 40 cm, preferably a maximum of 30 cm. The closer the at least one gas nozzle is to the feedthrough, the better it can prevent the exiting of dust and/or exhaust gas from the glass melting plant.

The feeding device according to the present invention can have a multiplicity of supply devices for the bulk material, preferably configured next to one another in the horizontal direction. In addition, the feeding device can have at least two sliders, and, correspondingly, a respective movement device (one or more components moved by a drive such as linking rods) for each slider. The feeding device can have a common drive for all movement devices, or can have a separate drive for each movement device. Given the use of a plurality of movement devices, for each movement device there can be provided a separate feedthrough through the sealing device and at least one separate gas nozzle (e.g., a nozzle ring)

in order to realize the seal particularly effectively. Here, the cyclical movement of the movement device(s) includes linear movements, movements back and forth, and pivoting movements, or combinations of these movements. The movements of the movement device(s) run horizontally and/or vertically.

In an exemplary embodiment of the present invention, a nozzle ring is provided that extends around the preferably rod-shaped movement device and has a multiplicity of gas nozzles. This exemplary embodiment enables a sealing in the entire open region of the feedthrough around the movement device. The nozzle ring can, for example, be realized as an annular or ellipsoidal tube that has a multiplicity of gas nozzle openings along the longitudinal direction of the tube (i.e., along the ring or the ellipsoid). Preferably, the tube is connected to a gas supply, and the connection is preferably made flexible. In addition, for the mounting it is advantageous that the nozzle ring is made with a multipart construction, the at least two parts of the nozzle ring preferably being fastened to one another detachably during mounting and setting up of the feeding device. The nozzle ring can surround the movement device partly or completely.

In a development of the present invention, a driver is provided on which the at least one gas nozzle is fastened and that displaces the at least one gas nozzle when there is a movement of the movement device relative to the sealing device (for example vertically) in such a way that the gas flow from the at least one gas nozzle is always directed to the open area of the feedthrough. This is advantageous because the movement device connected to the slider (paddle) is constantly in movement during operation of the feeding device, and its position relative to the feedthrough is constantly changing.

The driver can be realized with a plate shape, for example as a sliding plate, the plate having a through-going opening or aperture through which the movement device is guided. The at least one gas nozzle, or nozzle ring, is situated in the region of the edge of the through-going opening or aperture of the sliding plate. Here the nozzle ring can be situated on the side of the sliding plate facing the glass melting plant and/or on the side of the sliding plate facing away from the glass melting plant. In order to facilitate mounting, such a driver can be made with a multipart construction, and during mounting and setting up of the feeding device the at least two parts of the driver can preferably be fastened to one another in detachable fashion. The opening or aperture in the driver is preferably smaller in its cross-sectional surface than the cross-sectional surface of the associated feedthrough of the sealing device, where the cross-section is regarded in the vertical direction. Correspondingly, the vertical and/or horizontal diameter of the opening or aperture of the driver is/are smaller than the vertical and/or horizontal diameter of the feedthrough of the sealing device.

In addition, it is advantageous if the driver has, on the side facing the sealing device, a guide device that directs the gas escaping from the at least one gas nozzle in the direction of the feedthrough. The guide device is, for example, made up of at least two guide plates situated, for example, on two opposite sides of the at least one gas nozzle or of the nozzle ring. In an exemplary embodiment, a first guide plate is situated on the upper side of the nozzle ring and a second guide plate is situated on the lower side of the nozzle ring. Preferably, each of the first and the second guide plate has a concave curvature and/or is made in the shape of a shell. The guide device can surround the at least one gas nozzle partly or completely. By means of the guide device, the seal can be still more effectively formed by the at least one gas nozzle.

In an exemplary embodiment of the feeding device according to the present invention, the driver is supported on the movement device by a roller. This is a particularly simple possibility for realizing the vertical orientation of the driver with a simultaneously horizontal movability of the movement device.

In a further exemplary embodiment, the vertical orientation of the at least one gas nozzle on the feedthrough is achieved in that the driver is guided parallel to the sealing device by at least one roller and/or rail. The at least one roller and/or rail is preferably fastened on the sealing device, at a specified distance in each case. In this way, the driver moves back and forth in the vertical direction and follows the cyclical movement of the movement device. Here, due to the guiding parallel to the sealing device, the distance of the driver from the sealing device (distance in the horizontal direction) remains constant.

For an effective sealing of the feedthrough, it is further advantageous if the outlet pressure of the at least one gas nozzle is at least 80% of the magnitude of the internal pressure of the glass melting plant, preferably at least 90% of the magnitude of the internal pressure of the glass melting plant, particularly preferably at least 110% and/or a maximum of 200% of the magnitude of the internal pressure of the glass melting plant. In an exemplary embodiment of the present invention, the internal pressure of the glass melting plant (e.g., in the melt tub or in the doghouse) can be measured, and the outlet pressure of the gas exiting the at least one gas nozzle can be adapted corresponding to the respective current internal pressure measurement value. Above, the magnitude (value) of the internal pressure of the glass melting plant (e.g., of the glass melt tub) was used in each case, because the pressure of the gas nozzle in each case is an excess pressure (positive value), in order to achieve the effect described above. If the internal pressure of the glass melting plant is negative, then in this case the (negative) sign of the internal pressure should not be taken into account for the determination of the outlet pressure of the glass melting plant.

BRIEF DESCRIPTION OF THE DRAWINGS

In the following, the present invention is explained on the basis of exemplary embodiments with reference to the Figures. All features described and/or shown graphically, in themselves or in any combination, form the subject matter of the present invention, independent of their summarization in the claims or the relations of dependence thereof.

DETAILED DESCRIPTION OF THE PREFERRED EMBODIMENTS

Figure 1:
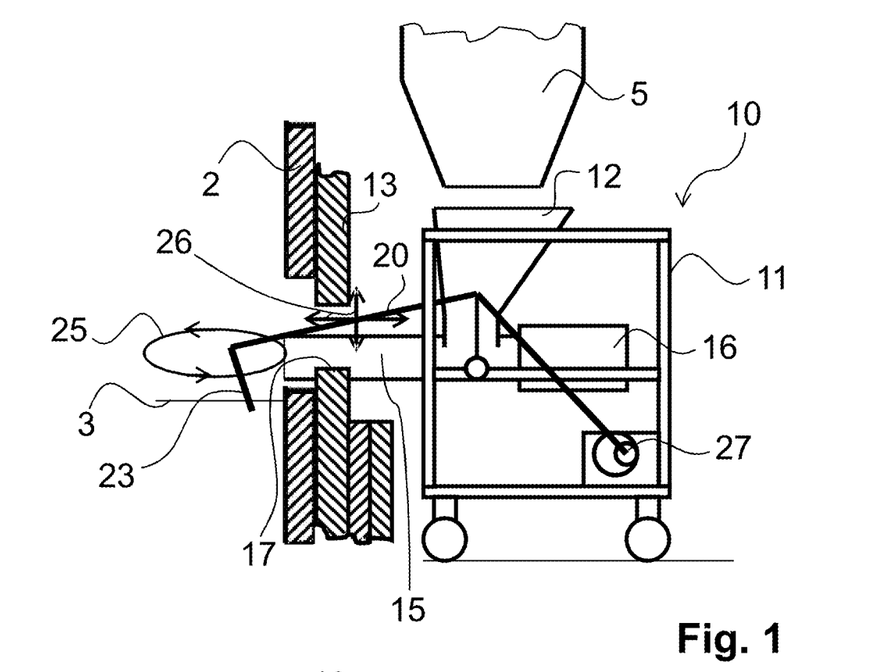
FIG. 1 shows a schematic representation of a feeding device according to the present invention situated on the melt tub or on a doghouse of a glass melting plant, in a longitudinal section.

FIG. 1 shows a feeding device according to the present invention for a glass melting plant in a schematic view. The schematic design shown in FIG. 1 of feeding device 10 according to the present invention holds for all the exemplary embodiments described below.

Figure 2:
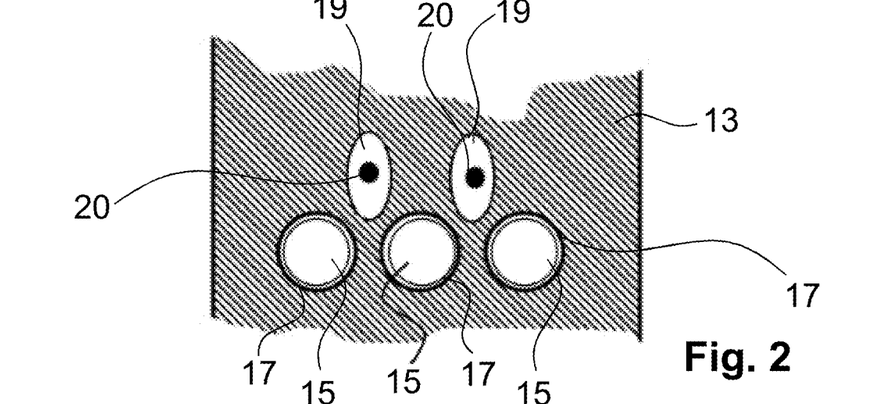
FIG. 2 shows a section through a sealing plate of the schematic representation of a feeding device according to FIG. 1.

Feeding device 10, having a frame 11 and situated on a melt tub 2, is situated below a supply hopper 5 in which the bulk material (raw material batch, glass shards) to be supplied is intermediately stored. The bulk material moves via a respective funnel-shaped feed opening 12 to three conveyor devices 15 that run substantially horizontally and are situated next to one another in the horizontal direction (see FIG. 2), and which convey the bulk material into melt tub 2 in each case via a conveyor drive 16. Alternatively, the bulk material can also be supplied to a doghouse. Conveyor device 15 can, for example, be realized as a belt conveyor device or screw conveyor device; preferably, as shown in FIG. 2, conveyor device 15 is situated in a closed sealed tube. Alternatively, the feeding device can have only one conveyor device 15, two conveyor devices 15, or more than three conveyor devices 15.

In order to seal the opening of melt tub 2 outwardly, feeding device 10 has a sealing plate 13 that lies in sealing fashion on the outer wall of melt tub 2. For the guiding through of the, for example, three conveyor devices 15 situated alongside one another (see FIG. 2), sealing plate 13 has three circular openings 17 situated next to one another whose inner diameter is only slightly larger than the outer diameter of the tube of the respective conveyor device 15. In this way, a good seal of melt tub 2 to the outside is achieved in the area of conveyor devices 15.

Feeding device 10 according to the present invention additionally has two paddles (sliders) 23 that are each connected to a separate eccentric drive 27 via a separate movement device in the form of a push rod 20. Each paddle 23 executes a cyclical movement that is indicated by arrows 25, 26 and that distributes the bulk material placed on surface 3 of the glass melt (melt mirror) in order to improve the melting. The cyclical movement is composed of circular movements (arrow 25) and vertical or horizontal movements (see arrows 26). Here, paddle 23 is first immersed into the deposited bulk material, and this material is moved in the direction of the center of the tub by a horizontal movement of paddle 23. Subsequently, paddle 23 is lifted upward and guided back to the initial position. This cyclical movement is produced by eccentric drive 27 connected to push rod 20.

Because, as FIG. 1 shows, push rod 20 also has to be guided through sealing plate 13, a respective feedthrough 19 is provided in sealing plate 13 for each push rod 20, as is shown in FIG. 2. Due to the movability of push rod 20 during operation of the feeding device, each feedthrough 19 has to be made significantly larger than the diameter of push rod 20 would actually require. Without corresponding countermeasures, this open space causes an exit of dust and exhaust gas from the glass melting plant.

Figure 3:
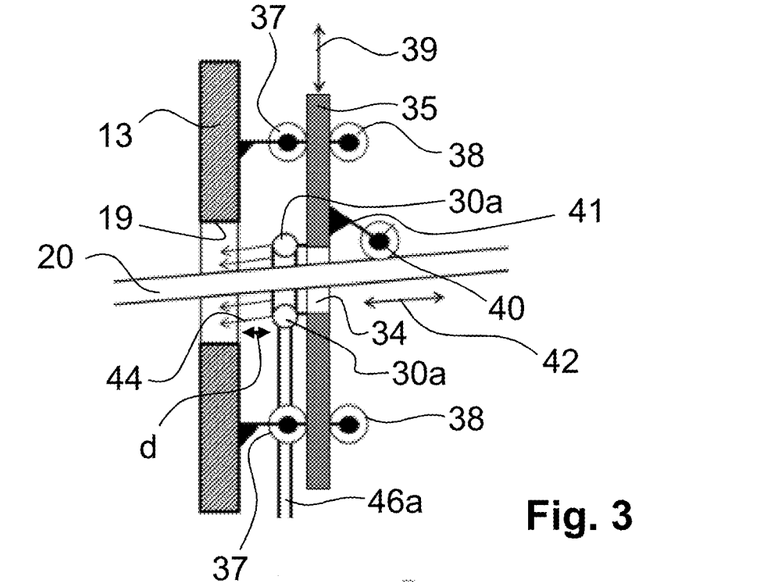
FIG. 3 shows a detail of the longitudinal section of a first exemplary embodiment of the feeding device.

In order to prevent the exit of dust and/or exhaust gas from the glass melting plant, a ring nozzle 30a is provided on a sliding plate 35, situated on the front side of sliding plate 35 (i.e., on the side facing the glass melting plant), as shown in a first exemplary embodiment in FIG. 3. Ring nozzle 30a is situated on the edge of a through-going opening 34 in sliding plate 35 through which push rod 20 is guided. Opening 34 in sliding plate 35 has a smaller cross-sectional surface (or a smaller horizontal and/or vertical diameter) than does feedthrough 19 of sealing plate 13. Ring nozzle 30a has a distance d from feedthrough 19 of, for example, a maximum of 40 cm. For better functioning, it is advantageous if the ring nozzle is situated on feedthrough 19 with a small distance d. The gas, for example air, exiting from ring nozzle 30a and oriented in the direction of feedthrough 19 (see arrows 44) produces a counterpressure that acts against dust and exhaust gas flowing in the direction of feedthrough 19, and in this way prevents them from exiting from the glass melting plant. The sealing of the glass melting plant thereby brought about functions to a certain extent without contact, i.e., without mechanical contact with the glass melting plant or with sealing plate 13. In this way, a heating of ring nozzle 30a is reduced. The gas is supplied by a gas supply line 46a that is connected to ring nozzle 30a.

Ring nozzle 30a is realized as a circular ring or elliptical ring, and surrounds push rod 20 preferably completely. Ring nozzle 30 is made up of one or more annular or ellipsoidal tube elements, having a preferably flexible connection for the supply of air. The tube element has over its entire length, i.e., over the entire circumference, a multiplicity of openings that are configured such that the air exiting from these openings flows in the direction of feedthrough 19 of sealing plate 13 or of gas melting plant 2. Alternatively, a multiplicity of ring nozzles 30a can also be provided, each ring nozzle 30a having a different angle of flow of the exiting air.

Sliding plate 35, to which ring nozzle 30a is fixedly connected, is vertically guided movably between two pairs of rollers 37, 38 (see double arrow 39). The movement of sliding plate 35 runs parallel to the surface of sealing plate 13. Rollers 37 situated on the side of melt tub 2 are fixedly connected to sealing plate 13. The same also holds for rollers 38 situated on the side of sliding plate 35 opposite melt tub 2. Rollers 37, 38 are each situated in the vertical direction along sliding plate 35 above and below ring nozzle 30a, in order to bring about a secure fixing of sliding plate 35. Through the vertical movability of the sliding plate (see arrow 39) and thus of ring nozzle 30a, ring nozzle 30a can follow the movement of push rod 20 in the vertical direction. Because push rod 20 also moves horizontally (see double arrow 42 in FIG. 3), sliding plate 35 has, in addition, a support roller 40 that supports sliding plate 35 on push rod 20, although push rod 20 moves in the horizontal direction during its cyclical movement. As a result, sliding plate 35, and with it ring nozzle 30a, can always remain in a fixed vertical position relative to push rod 20, and provide an optimal seal of the open space of feedthrough 19. Support roller 40 is fastened on sliding plate 35 by a strut 41.

Figure 4:
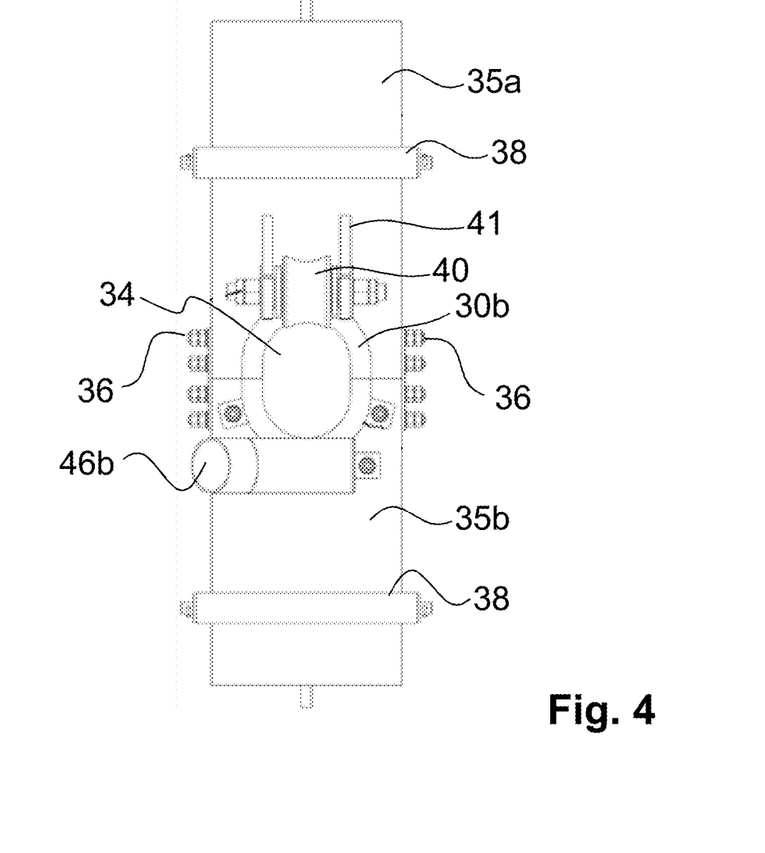
FIG. 4 shows the sliding plate of a second exemplary embodiment of a feeding device with the ring nozzle, in a view from the rear.

FIGS. 4 through 6 and 10 show sliding plate 35 of another exemplary embodiment of a feeding device according to the present invention, in various views. In FIG. 4, it can be seen that the sliding plate can be realized in two parts, made up of an upper part 35a and a lower part 35b. Correspondingly, nozzle ring 30b, which in this exemplary embodiment is situated on the side of sliding plate 35a, 35b facing away from the glass melting plant, is also made in two parts. First part 35a and second part 35b of the sliding plate, as well as both parts of nozzle ring 30b, can be situated around push rod 20 during the mounting of the feeding device, and can be fastened to one another by fastening screws 36.

In addition, in this exemplary embodiment two guide plates 50a, 50b are provided that direct the gas exiting from ring nozzle 30b in the direction of feedthrough 19 of sealing plate 13, or the glass melting plant. The variant shown in FIG. 10 does not have these guide plates. Each of the shell-shaped guide plates 50a, 50b stands perpendicular, or at a large angle, to the surface of sliding plate 35, and additionally has, as can be seen in particular in FIG. 6, a concave rounding by which the gas exiting from ring nozzle 30b is directed particularly effectively in the direction of feedthrough 19.

Figure 7:
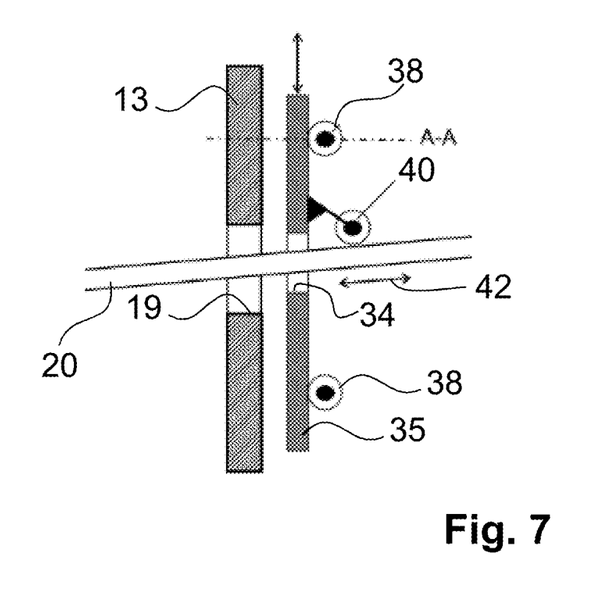
FIG. 7 shows a detail of the longitudinal section of a third exemplary embodiment of the feeding device.
Figure 8:
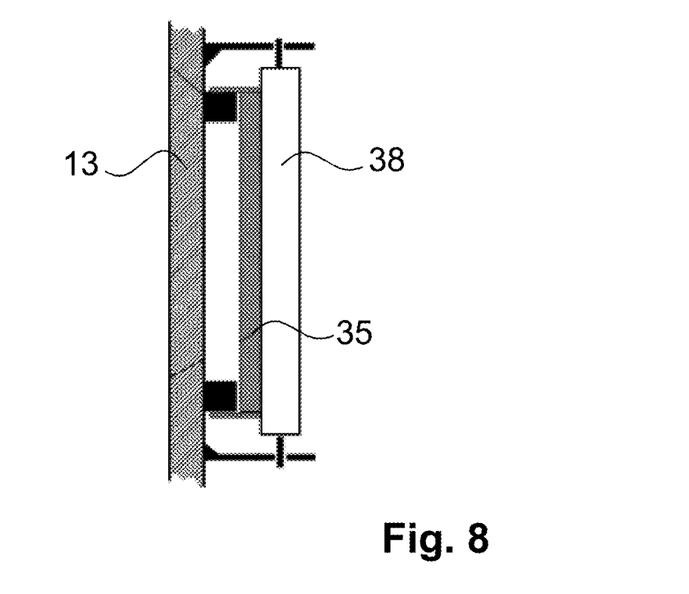
FIG. 8 shows a cross-section along the line A-A through the detail shown in FIG. 7.

FIG. 7 is intended to show that the movability of sliding plate 35 in the vertical direction can also take place through only two rollers 38 situated one under the other on the same side of sliding plate 35. In this case, rollers 38 are situated on the side of the sliding plate facing away from the glass melting plant. In addition, as FIG. 8 shows, rollers 38 are fastened on sealing plate 13 at a distance therefrom. Preferably, sliding plate 35 is permanently pressed against rollers 38 by a corresponding spring device (not shown) in order to bring about the spatial fixing of sliding plate 35. The gas nozzles are not shown in the representation of this exemplary embodiment.

Figure 9:
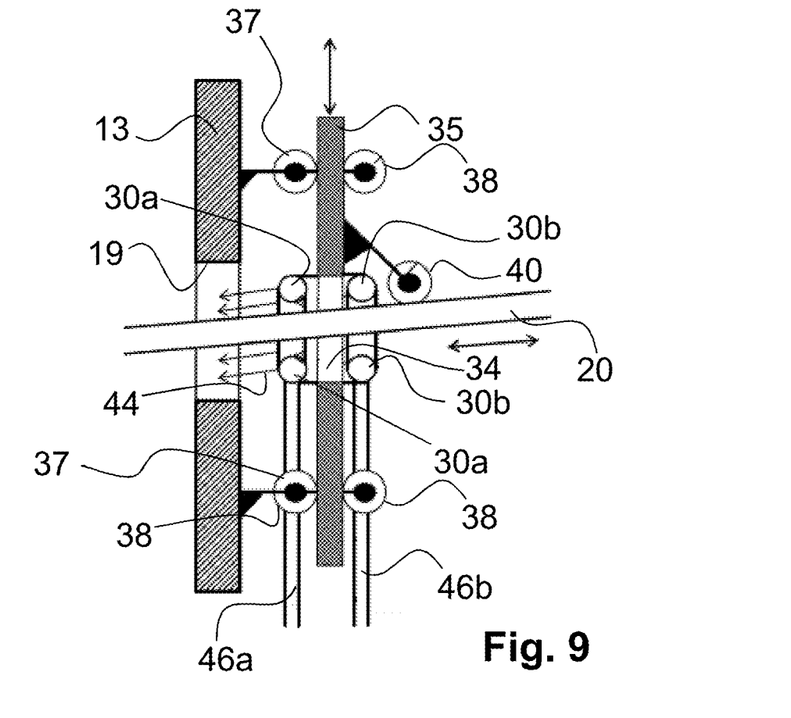
FIG. 9 shows a detail of the longitudinal section of a fourth exemplary embodiment of the feeding device.
Figure 10:
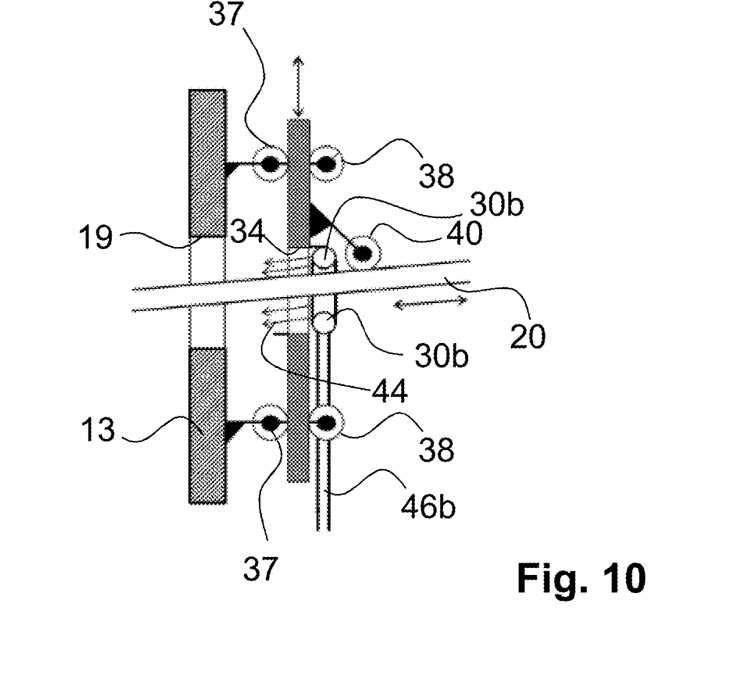
FIG. 10 shows a detail of the longitudinal section of a fifth exemplary embodiment of the feeding device.

The exemplary embodiment shown in FIG. 9 has two ring nozzles 30a, 30b, first ring nozzle 30a being situated on the side of sliding plate 35 facing the glass melting plant, and second ring nozzle 30b being situated on the side of the sliding plate facing away from the glass melting plant. Each ring nozzle 30a, 30b is fastened on the circumferential edge of opening 34 of sliding plate 35 and is provided with a separate gas supply line 46a, 46b.

Figure 5:
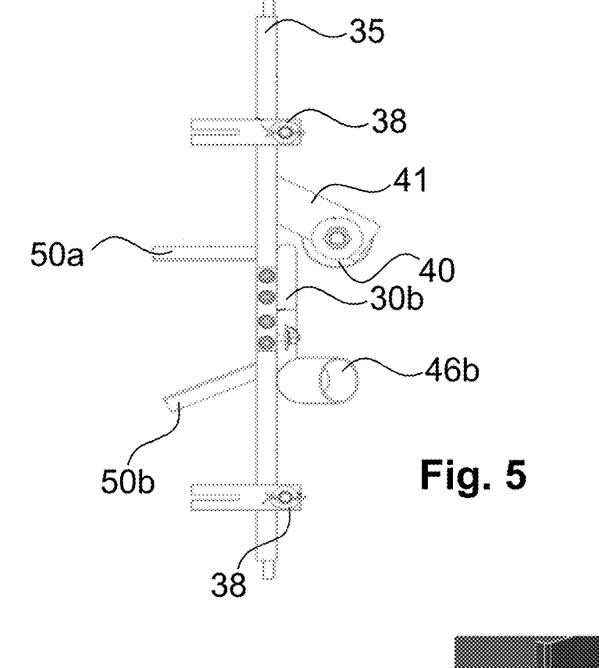
FIG. 5 shows the sliding plate according to FIG. 4 in a view from the side.
Figure 6:
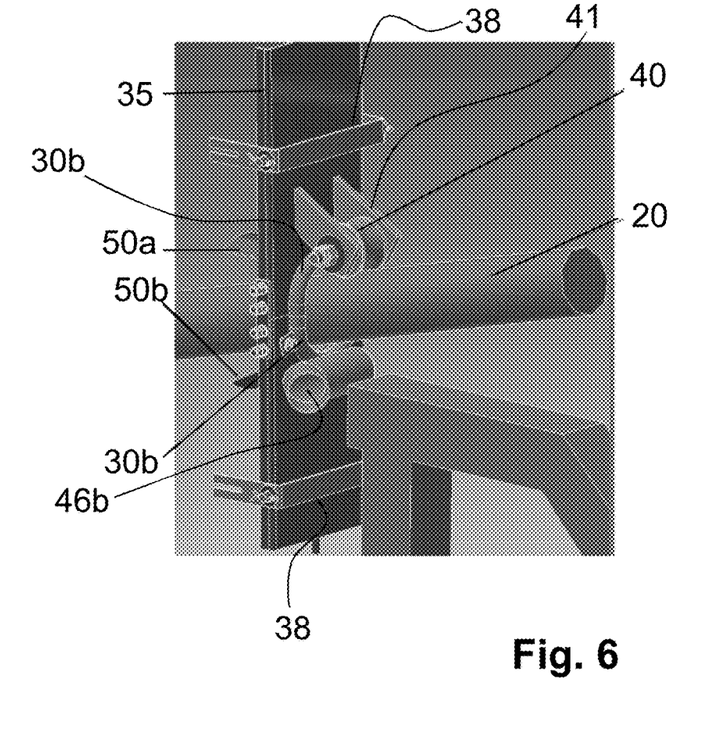
FIG. 6 shows the sliding plate according to FIG. 4 in a perspective view from the rear.
Figure 11:
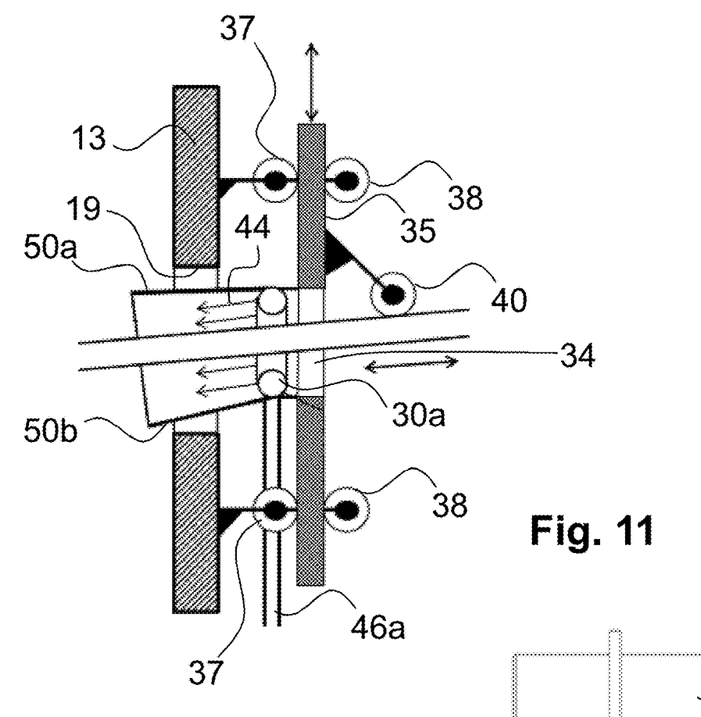
FIG. 11 shows a detail of the longitudinal section of a sixth exemplary embodiment of the feeding device.
Figure 12:
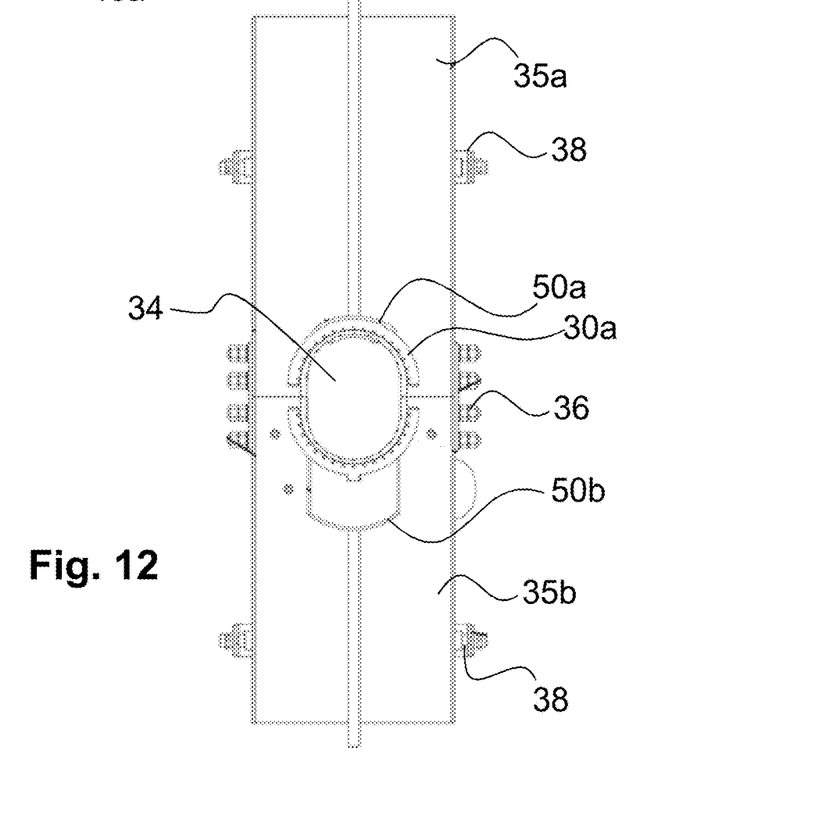
FIG. 12 shows the sliding plate of the feeding device according to FIG. 11 in a view from the front.

The exemplary embodiment according to FIGS. 11 and 12 has, only on the side of sliding plate 35 facing the glass melting plant, a ring nozzle 30a and in addition guide plates 50a, 50b, analogous to the exemplary embodiment according to FIGS. 4 through 6. Here, ring nozzle 30a, situated on the side of sliding plate 35 facing the glass melting plant, is placed directly between guide plates 50a, 50b.

The feeding device according to the present invention having the at least one gas nozzle on sealing plate 13, which is preferably realized as an annular or ellipsoidal nozzle ring, brings about a particularly effective sealing of feedthrough 19 for push rod 20 of the respective paddles 23. Here, the diameter of the nozzle ring, or the distance of the gas nozzles situated around the push rod, is adapted to the size of the respective feedthrough.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 2 melt tub
3 melt mirror
5 supply hopper
10 feeding device
11 frame
12 feed opening
13 sealing plate
15 conveyor device
16 conveyor drive
17 opening in sealing plate 13 for conveyor device 15
19 feedthrough in sealing plate 13 for push rod 20
20 push rod
23 paddle
25, 26 arrow
27 eccentric drive
30a, 30b ring nozzle
34 opening in sliding plate 35
35 sliding plate
35a, 35b part of the sliding plate
36 fastening screw
37, 38 roller
39, 42 arrow
40 support roller
41 strut
46a, 46b gas supply line with flexible connection to the respective ring nozzle
50a, 50b guide plate
d distance between feedthrough and gas nozzle

The invention claimed is:

1. A feeding device for a glass melting plant comprising a sealing device, and
at least one movement device, the movement device executing a cyclical movement during operation of the feeding device and being guided through the sealing device along at least one feedthrough,
wherein adjacent to an open area of each feedthrough at least one gas nozzle is situated on a side of the sealing device facing away from the glass melting plant in such a way that gas flowing out from the at least one gas nozzle reduces a quantity of at least one of dust or exhaust gas moving out of the glass melting plant through the respective feedthrough to the side of the sealing device facing away from the glass melting plant, and
wherein a nozzle ring is provided that extends around the movement device and has a multiplicity of gas nozzles.

2. The feeding device as recited in claim 1, wherein on the at least one movement device a slider is situated that is fastened to the movement device on a side of the sealing device facing the glass melting plant.

3. The feeding device as recited in claim 2, wherein the slider is fastened detachably to the movement device.

4. The feeding device as recited in claim 1, wherein an outlet pressure of the at least one gas nozzle is at least 80% of a magnitude of an internal pressure of the glass melting plant.

5. The feeding device as recited in claim 1, wherein an outlet pressure of the at least one gas nozzle is at least 90% of a magnitude of an internal pressure of the glass melting plant.

6. The feeding device as recited in claim 1, wherein an outlet pressure of the at least one gas nozzle is a maximum of 200% of a magnitude of an internal pressure of the glass melting plant.

7. A feeding device for a glass melting plant comprising a sealing device, and
at least one movement device, the movement device executing a cyclical movement during operation of the feeding device and being guided through the sealing device along at least one feedthrough,
wherein adjacent to an open area of each feedthrough at least one gas nozzle is situated on a side of the sealing device facing away from the glass melting plant in such a way that gas flowing out from the at least one gas nozzle reduces a quantity of at least one of dust or exhaust gas moving out of the glass melting plant through the respective feedthrough to the side of the sealing device facing away from the glass melting plant, and
wherein a driver is provided to which the at least one gas nozzle is fastened and wherein, when there is a movement of the movement device, displaces the at least one gas nozzle relative to the sealing device in such a way that the gas flowing out from the at least one gas nozzle is always directed to the open area of the feedthrough.

8. The feeding device as recited in claim 7, wherein the driver is made with a plate shape, the plate-shaped driver having an opening or aperture through which the movement device is guided.

9. The feeding device as recited in claim 7, wherein the driver has, on a side facing the sealing device, a guide device that directs the gas escaping from the at least one gas nozzle in a direction of the feedthrough.

10. The feeding device as recited in claim 7, wherein the driver is supported on the movement device by a roller.

11. The feeding device as recited in claim 7, wherein the driver is guided parallel to the sealing device by at least one roller.

12. The feeding device as recited in claim 7, wherein the driver is guided parallel to the sealing device by a rail.

13. The feeding device as recited in claim 7, wherein the driver is made a plate shape.

14. The feeding device as recited in claim 7, wherein the driver is made with a multipart construction.

15. The feeding device as recited in claim 7, wherein a multiplicity of gas nozzles extends at least partly along an edge of an aperture or opening in the driver.

* * * * *